3,732,210
PROCESS FOR THE MANUFACTURE OF
PREGNANE-20-ONE-3β,5β,14β,21-TETROL
Ulrich Stache, Hofheim, Taunus, Werner Fritsch, Neuenhain, Taunus, Werner Haede, Hofheim, Taunus, and Kurt Radscheit, Kelkheim, Taunus, Germany, assignors to Farbwerke Hoechst Aktiengesellschaft vormals Meister Lucius & Bruning, Frankfurt am Main, Germany
No Drawing. Filed Jan. 26, 1971, Ser. No. 109,932
Claims priority, application Germany, Jan. 28, 1970,
P 20 03 653.7
Int. Cl. C07c 173/00
U.S. Cl. 260—239.55 R  3 Claims

ABSTRACT OF THE DISCLOSURE

A process for the manufacture of pregnane-20-one-3β,5β,14β,21-tetrol, useful as a starting material for pharmaceutically valuable compounds of the pregnane series, by converting $\Delta^{4,14}$-pregnadiene-3,20-dione-21-ol to the corresponding 3,20 - bis-alkylene-dioxy-$\Delta^{5,14}$-pregnadiene-21-ol with ethylene glycol or neopentyl glycol; acylating to form the 21-acylate and then partially de-ketalizing the acylate to produce 20-alkylene-dioxy-$\Delta^{4,14}$-pregnadiene-3-one-21-acylate; reducing the 3-keto group with an organometallic reducing agent, whereby the 21-acylate group may also be converted by the reducing agent to the 21-ol; acylating the 20-alkylene-dioxy-$\Delta^{4,14}$-pregnadiene-3,21-diol or -3-ol-21-acylate to form 20-alkylene-dioxy-$\Delta^{4,14}$-pregnadiene-3,21-diacylate; treating this with hypobromous acid to form 5α,15α-dibromo-20-alkylene-dioxy-pregnane-3β,5β,14β,21-tetrol-3,21-diacylate and debrominating with a base to form 20-alkylene-dioxy-4β(5β), 14β(15β-dioxido-pregnane-3β,21-diol or the corresponding -3,21-diacylate; and reducing to 20-alkylene-dioxy-pregnane-3β,5β,14β,21-tetrol with an organometallic reducing agent. The 20-alkylene-dioxy group is hydrolyzed to form the desired pregnane-20-one-3β,5β,14β,21-tetrol, which may be further reacted with dihydropyrane to form the corresponding -3β,21-ditetrahydropyranyl ether.

The present invention relates to a process for the manufacture of pregnane-20-one-3β,5β,14β,21-tetrol, and to intermediates and derivatives thereof.

It is already known from German Auslegeschrift 1 240 075 that a 10-step reaction of $\Delta^{14}$-11-desoxy-corticosterone acetate yields pregnane-20-one-3β,5β,14β-21-tetrol-3,21-diacetate which can subsequently be converted by three further reaction steps into periplogenin, the aglucone of a natural heart glycoside.

According to this synthesis, the 20-keto function necessary for subsequent reaction with lithium-ethoxyacetylide is first necessarily reduced to the 20-alcohol group which has to be reoxidized later on. For this purpose, two selective acetylation reactions in the 3- and then in the 21-position, which are difficult experimentally, have to be carried out. The free tetrol or the 3,21-bis-tetrahydropyranyl ether thereof is more advantageous for the butenolide ring closure. The pregnane-20-one-3β,5β, 14β,21-tetrol-3,21-diacetate can, however, only be partially hydrolyzed to yield the free tetrol since, first of all, the 14β-hydroxy group obviously enters into an irreversible reaction with the 20-keto function to yield the cyclic semi-acetal of the partial formula

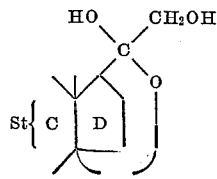

The present invention provides an advantageous process for the preparation of pregnane-20-one-3β,5β,14β,21-tetrol having free hydroxy groups, in which the 20-keto function with the ketal protective group is maintained latent throughout the reaction steps and is split by hydrolysis in the last step.

According to the process for the manufacture of pregnane-20-one-3β,5β,14β,21-tetrol of the following formula (X), $\Delta^{4,14}$-pregnadiene-3,20-dione-21-ol (I) is converted into the corresponding 3,20-bis-alkylene-dioxy-$\Delta^{5,14}$-pregnadien-21-ol (II) with ethylene glycol or neopentyl glycol. This is treated with acylating agents and the 21-acylate (III) obtained is then partially deketalized, the 3-keto group of 20-alkylene-dioxy-$\Delta^{4,14}$-pregnadiene-3-one-21-ol acetate (IV) is reduced by means of organo-metallic reducing agents to the 3-hydroxy group (V), whereby the 21-acylate group may be converted into the free alcohol group by the reducing agent. The 20-alkylene-dioxy-$\Delta^{4,14}$-pregnadiene-3,21-diol or its 21-acylate obtained in this manner is acylated to yield 20-alkylene-dioxy-$\Delta^{4,14}$-pregnadiene-3,21-diol diacetate (VI). This is treated with hypobromous acid (HOBr). The resulting 5α,15α-dibromo-20-alkylene-dioxy-pregnane-3β,4β,14β,21-tetrol - 3,21 - diacylate (VII) is treated with inorganic or organic bases or mixtures thereof and the 20-alkylene-dioxy-4β(5β), 14β(15β)-dioxido-pregnane - 3β,21 - diol (VIII) thus obtained, or the corresponding 3,21-diacylate, is then reduced by means of organometallic reducing agents to the 20-alkylene-dioxy-pregnane-3β,5β,14β,21-tetrol (IX). This is deketalized with acids to yield pregnane-20-one-3β,5β, 14β,21-tetrol (X) which may be converted into the corresponding 3β,21-di-tetrahydropyranyl ether by subsequent reaction with dihydropyrane.

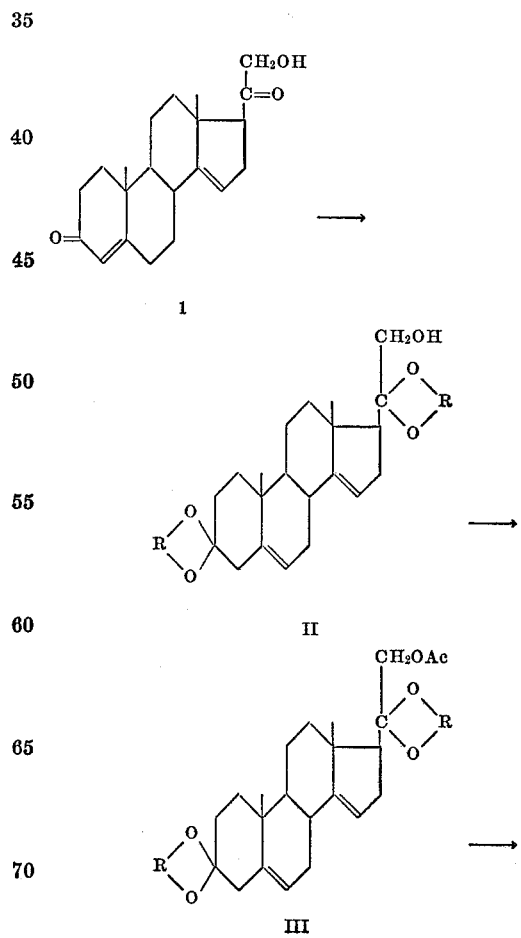

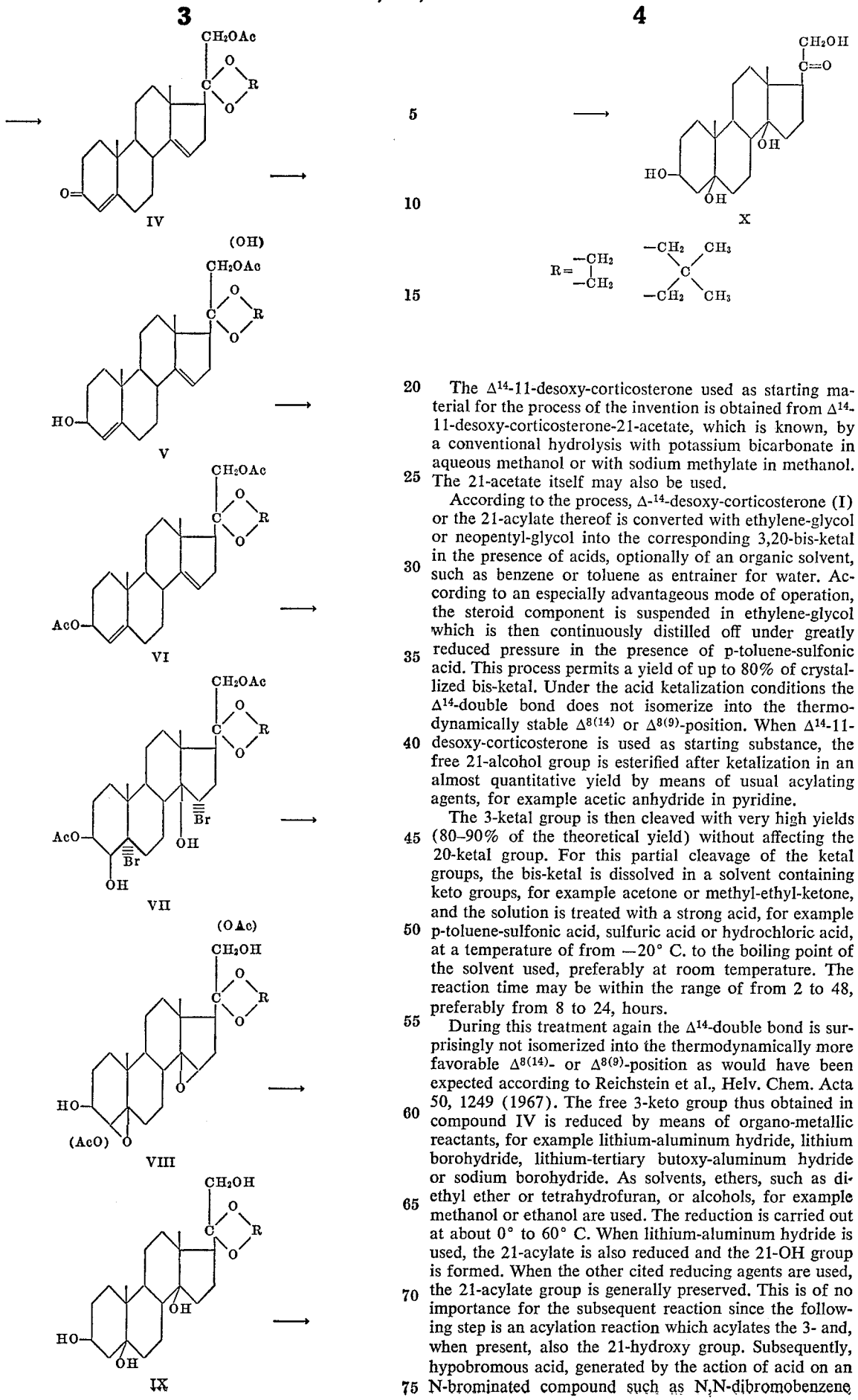

The $\Delta^{14}$-11-desoxy-corticosterone used as starting material for the process of the invention is obtained from $\Delta^{14}$-11-desoxy-corticosterone-21-acetate, which is known, by a conventional hydrolysis with potassium bicarbonate in aqueous methanol or with sodium methylate in methanol. The 21-acetate itself may also be used.

According to the process, $\Delta$-$^{14}$-desoxy-corticosterone (I) or the 21-acylate thereof is converted with ethylene-glycol or neopentyl-glycol into the corresponding 3,20-bis-ketal in the presence of acids, optionally of an organic solvent, such as benzene or toluene as entrainer for water. According to an especially advantageous mode of operation, the steroid component is suspended in ethylene-glycol which is then continuously distilled off under greatly reduced pressure in the presence of p-toluene-sulfonic acid. This process permits a yield of up to 80% of crystallized bis-ketal. Under the acid ketalization conditions the $\Delta^{14}$-double bond does not isomerize into the thermodynamically stable $\Delta^{8(14)}$ or $\Delta^{8(9)}$-position. When $\Delta^{14}$-11-desoxy-corticosterone is used as starting substance, the free 21-alcohol group is esterified after ketalization in an almost quantitative yield by means of usual acylating agents, for example acetic anhydride in pyridine.

The 3-ketal group is then cleaved with very high yields (80–90% of the theoretical yield) without affecting the 20-ketal group. For this partial cleavage of the ketal groups, the bis-ketal is dissolved in a solvent containing keto groups, for example acetone or methyl-ethyl-ketone, and the solution is treated with a strong acid, for example p-toluene-sulfonic acid, sulfuric acid or hydrochloric acid, at a temperature of from —20° C. to the boiling point of the solvent used, preferably at room temperature. The reaction time may be within the range of from 2 to 48, preferably from 8 to 24, hours.

During this treatment again the $\Delta^{14}$-double bond is surprisingly not isomerized into the thermodynamically more favorable $\Delta^{8(14)}$- or $\Delta^{8(9)}$-position as would have been expected according to Reichstein et al., Helv. Chem. Acta 50, 1249 (1967). The free 3-keto group thus obtained in compound IV is reduced by means of organo-metallic reactants, for example lithium-aluminum hydride, lithium borohydride, lithium-tertiary butoxy-aluminum hydride or sodium borohydride. As solvents, ethers, such as diethyl ether or tetrahydrofuran, or alcohols, for example methanol or ethanol are used. The reduction is carried out at about 0° to 60° C. When lithium-aluminum hydride is used, the 21-acylate is also reduced and the 21-OH group is formed. When the other cited reducing agents are used, the 21-acylate group is generally preserved. This is of no importance for the subsequent reaction since the following step is an acylation reaction which acylates the 3- and, when present, also the 21-hydroxy group. Subsequently, hypobromous acid, generated by the action of acid on an N-brominated compound such as N,N-dibromobenzene sulfonic acid amide or N-bromo-acetamide, is added to the $\Delta^4$- and $\Delta^{14}$-double bonds of compound VI thus obtained. The 20-ketal group is not cleaved by this treatment. The bis-bromohydrine (VII) obtained is then treated with bases, whereupon the $4\beta(5\beta),14\beta(15\beta)$-bis-epoxy groups are formed with elimination of hydrogen bromide. When inorganic bases, such as sodium or potassium hydroxide in methanol are used, 20-alkylene-dioxy-$4\beta(5\beta),14\beta(15\beta)$-dioxido-pregnane-$3\beta,21$-diol (VIII) is obtained with simultaneous hydrolysis of the 3- and 21-acetate groups. When tertiary organic bases, for example 1,5 - diazo - bicyclo[4,3,0]-nonene, diethyl aniline, triethylamine, in inert solvents, for example tetrahydrofuran, ethyl acetate or benzene, are used, the acyl groups in the 3- and 21-pisitions are generally not hydrolyzed at the same time with the formation of epoxy groups.

After the subsequently reductive cleavage of the two oxido groups in the 4(5)- and 14(15)-positions in compound VIII by means of organo-metallic reactants, the 3- and 21-acylate groups, if any, are simultaneously converted into the free 3- and 21-hydroxy groups and, in both cases, the same reaction product, 20-alkylene-dioxy-pregnane-$3\beta,5\beta,14\beta,21$-tetrol (IX), is obtained. The reductive cleavage is carried out, for example, using lithium-aluminum hydride in the usual inert solvents, for example tetrahydrofuran or an ether. The tetrol (X) is prepared by spitting the 20-alkylene -dioxy-groups. The 20-ketal group can advantageously be cleaved by heating the steroid component (X) for 15 to 75 minutes in a mixture of glacial acetic acid and water at a ratio of 3:1 to 2:1, preferably to a temperature of from 80 to 100° C. Under these conditions it is, surprisingly, possible to obtain the tertiary hydroxy groups which are sensitive to acids in the 14- and 5-positions. The yield of pure crystallized pregnane - 20 - one - $3\beta,5\beta,14\beta,21$-tetrol (X) amounts to 80%.

The product of the invention thus obtained can then be converted selectively, with a quantitative yield, into the pregnane - 20 - one - $3\beta,5\beta,14\beta,21$-tetrol-3,2,1-dipyranyl ether in the presence of inert solvents, for example, tetrahydrofuran, dioxan, benzene, toluene, and of acid catalysts, for example boron-trifluoride-etherate, phosphorus oxychloride, or gaseous hydrogen chloride, at a temperature of from 0° to about 50° C., preferably of 20° C.

The pregnane-20-one-$3\beta,5\beta,14\beta,21$-tetrol prepared according to the present invention is an important intermediate for the preparation of periplogenin, which exhibits a positive inotropic action. In only a two-step reaction, this tetral (X) or the bis-pyranyl ether thereof can be converted into the corresponding 20-carbinol derivatives with lithium acetylide in a solvent, for example diethtyl ether, tetrahydrofuran, dioxan, benzene, toluene or in mixtures of these solvents. The 20-carbinol derivatives are then treated for a short time in an acid medium, whereupon, with butenolide ring closure, periplogenin is obtained and, at the same time, the pyranyl ether groups in the 3- and 21-positions are eliminated.

Moreover, the product of the invention (X) can be used as a starting material for further pharmaceutically valuable compounds of the pregnane series. Furthermore, the 20-alkylene-dioxy-$\Delta^{4,14}$-pregnadiene - 3 - one - 21 - ol acetate (IV) obtained as intermediate in the synthesis can also be used as an important key product for the preparation of further cardioactive cardenolides of the digitoxigenin, uzarigenin, and canarigenin type.

The following examples serve to illustrate the invention.

EXAMPLE 1

Pregnane-20-one-$3\beta,5\beta,14\beta,21$-tetrol (a) Preparation of compound II.—40 g. of pregna-4,14-diene-3,20-dione-21-ol (I), 0.73 g. of p-toluene-sulfonic acid and 1650 ml. of ethylene-glycol were subjected to a slow distillation for 90 minutes under a pressure of from 2 to 3.5 mm. Hg and a temperature of about 80° C. Subsequently, 50 ml. of an aqueous saturated sodium bicarbonate solution were added to the reaction mixture and then the mixture was extracted several times with methylene chloride. The extract was washed with water, dried and distilled off in vacuo. The residue was dissolved in methylene chloride/methanol and the majority of methylene chloride was then distilled off again, whereupon the reaction product crystallized slowly from the remaining methanol. The crystals were suction-filtered and 34.3 g. of 3,20 - bis - (ethylenedioxy)-$\Delta^{5,14}$-pregnadiene - 21 - ol (II) were obtained, M.P. 202–204° C.

Typical infrared bands (in KBr): 3450, 3040, 1085, 1045 cm.$^{-1}$; there were no more bands in the CO-range.

(The melting points were determined with the aid of the Kofler block of Messrs. Reichert and are not corrected.)

(b) Preparation of compound III.—33.9 g. of 3,20-bis-ethylene-dioxy-$\Delta^{5,14}$-pregadiene-21-ol (II) were dissolved in 237 ml. of pyridine and 119 ml. of acetic anhydride and the solution was allowed to stand for 16 hours at 20° C. The reaction mixture was then poured into 1.5 l. of water, the crystals which had precipitated after some time were suction-filtered, washed with water and dried in vacuo over $P_2O_5$. 35.3 g. of 3,20-bis-(ethylene-dioxy)-21-acetoxy-$\Delta^{5,14}$-pregnadiene (III) were obtained, M.P. 152° C.

Typical infrared bands (in KBr): 3050, 1745, 1235, 1095, 1045 cm.$^{-1}$; no more OH present.

(c) Preparation of compound IV.—35.3 g. of 3,20-bis-(ethylene-dioxy)-21-acetoxy-$\Delta^{5,14}$-pregnadiene (III) were dissolved in 920 ml. of acetone and 3.5 g. of p-toluene-sulfonic acid were added. After standing for 15 hours at 20–25° C. the reaction mixture was poured onto 2 l. of water and the pH was adjusted to about 6 by means of 2 N sodium hydroxide solution. The precipitated crystals were suction-filtered, washed with water and dried in vacuo over $P_2O_5$. 29.4 g. of 20-ethylene-dioxy-21-acetoxy-$\Delta^{4,14}$-pregnadiene-3-one (IV) were obtained, M.P. 118° C.

Typical infrared bands (in KBr): 3050, 1740, 1670, 1610, 1225, cm.$^{-1}$.

UV: $\lambda$ max.=238 m$\mu$ (CH$_3$OH); $\epsilon$=16,200.

(d) Preparation of compound V.—A solution of 33.3 g. of 20-ethylene-dioxy-21-acetoxy-$\Delta^{4,14}$-pregnadiene - 3 - one (IV) in 800 ml. of absolute tetrahydrofuran was slowly added dropwise at an internal temperature of from 0–5° C. to a suspension of 13.3 g. of lithium-aluminum hydride in 300 ml. of absolute tetrahydrofuran. The reaction mixture was then stirred for 90 minutes at 20° C. and subsequently the excess of lithium-aluminum hydride was reacted successively with ethyl acetate, methanol and water. Ether was then added, the mixture was filtered by means of a clarifying-layer filter and the solvent was distilled off in vacuo. After digesting with ether the residue obtained yielded 26.9 g. of 20-ethylene-dioxy-$\Delta^{4,14}$-pregnadiene-$3\beta,21$-diol (V), M.P. 210° C.

Typical infrared bands (in KBr): 3480, (Broad), 3040, 1650, 1045 cm.$^{-1}$; no more ultraviolet maximum present.

(e) Preparation of compound VI.—23.6 g. of 20-ethylene-dioxy-$\Delta^{4,14}$-pregnadiene-$3\beta,21$-diol (V) were dissolved in 236 ml. of pyridine and 83 ml. of acetic anhydride and the solution was allowed to stand for 16 hours at 20° C. The reaction mixture was then poured into 600 ml. of water, the precipitated crystals were suction-filtered, taken up in methylene chloride, then washed with water and the solvent was distilled off in vacuo. The 20-ethylene-dioxy-$\Delta^{4,14}$-pregnadiene-$3\beta,21$-diol diacetate (VI) was obtained in the form of a foam (28.2 g.) which was used without further treatment for the subsequent reaction.

Typical infrared bands (as foam in KBr): 3045, 1740–1720, 1650, 1240–1215 (broad), 1040, 1010 cm.$^{-1}$, no more OH present.

(f) Preparation of compound VII.—114 ml. of water, 14.7 ml. of glacial acetic acid and then 20.9 g. of N,N-dibromo-benzene-sulfonamide were successively stirred at 10° C. into a solution of 28.1 g. of 20-ethylene-dioxy-$\Delta^{4,14}$-pregnadiene-3$\beta$,21-diol diacetate (VI) in 280 ml. of dioxan. After stirring for 3 hours at 10–15° C., the mixture was poured into 1.5 l. of water containing Na$_2$SO$_3$, the precipitate was suction-filtered and taken up in methylene chloride. After washing with water the solvent was distilled off in vacuo at a maximum bath temperature of 30° C. and the 5$\alpha$,15$\alpha$-dibromo-20-ethylene-dioxy-pregnane-3$\beta$,4$\beta$,14$\beta$-21-tetrol - 3,21 - diacetate (VII, 36.8 g. in the form of a foam) was immediately used without further treatment for the subsequent reaction.

Typical infrared bands (in KBr): 3470, 1730, 1225, 1035 cm.$^{-1}$. Beilstein test: positive.

(g) Preparation of compound VIII (3,21-diol).—A solution of 36.1 g. of 5$\alpha$,15$\alpha$-dibromo-20-ethylene-dioxy-pregnane-3$\beta$,4$\beta$,14$\beta$,21-tetrol-3,21-diacetate (VII) in 200 ml. of methanol was combined with a solution of 36 g. of potassium hydroxide in 26 ml. of water and the whole was refluxed for 17 minutes. After cooling, 200 ml. of water were added, the mixture was extracted with methylene chloride, the extract was washed with water and the solvent was distilled off in vacuo. The residue obtained was crystallized from methylene chloride/methanol/ether. 15.3 g. of 20-ethylene-dioxy-4$\beta$(5$\beta$),14$\beta$(15$\beta$)-dioxido-pregnane-3$\beta$,21-diol (VIII) were obtained, M.P. 210–212° C.

Typical infrared bands (in KBr): 3490, 3420 (mostly as shoulder), 1145, 1030 cm.$^{-1}$.

Beilstein test: negative.

(h) Preparation of compound IX.—(1) A solution of 18.4 g. of 20-ethylene-dioxy-4$\beta$(5$\beta$),14$\beta$(15$\beta$)-dioxido-pregnane-3$\beta$,21-diol in 630 ml. of absolute tetrahydrofuran was added dropwise at 0° C. within 60 minutes to a suspension of 12 g. of lithium-aluminum hydride in 430 ml. of absolute tetrahydrofuran. The mixture was then stirred for 40 minutes at 0° C. and then refluxed for 4 hours. After cooling, the excess lithium-aluminum hydride was successively decomposed with 148 ml. of methanol and 17 ml. of water. After an addition of 510 ml. of ether the whole was filtered through a clarifying-layer filter and the solvent was distilled off in vacuo. The residue obtained was crystallized from ether. 17.2 g. of 20-ethylene-dioxy-pregnane-3$\beta$,5$\beta$,14$\beta$,21-tetrol were obtained, M.P. 210–212° C.

Typical infrared bands (in KBr): 3500–3460, 1080, 1040, 1020 cm.$^{-1}$.

(2) 6.2 g. of 5$\alpha$,15$\alpha$-dibromo-20-ethylene-dioxy-pregnane-3$\beta$,4$\beta$,14$\beta$,21-tetrol - 3,21 - diacetate (VII) obtained sub (f) in the form of a foam were dissolved in 30 ml. of absolute tetrahydrofuran and 2.75 g. of 1.5-diazabicyclo-[4,3,0]-5-nonene in 30 ml. of absolute tetrahydrofuran were added. The hydrobromide of the cited base precipitated at once. After standing for 16 hours at 20° C. the reaction mixture was poured onto water, extracted with methylene chloride which was washed with water, and the solvent was distilled off in vacuo. 4.4 g. of 20-ethylene - dioxy - 4$\beta$(5$\beta$),14$\beta$(15$\beta$) - dioxido - pregnane-3$\beta$,21-diol diacetate (VIII) were obtained as a pseudocrystalline foam which was used without further treatment for the subsequent reaction.

Typical infrared bands (in KBr): 1724–1730, 1230, 1150, 1020–1030 cm.$^{-1}$.

A solution of 3.15 g. of the reaction product VIII obtained (3,21-diacetate) in 220 ml. of absolute tetrahydrofuran was added dropwise at 0° C. to a suspension of 6 g. of lithium-aluminum hydride in 160 ml. of absolute tetrahydrofuran. The mixture was then stirred for 40 minutes at 0° C. and refluxed for 4 hours. After cooling, the excess LiAlH$_4$ was successively decomposed by means of ethyl acetate, methanol and water and the residue was extracted with chloroform. The extracts were washed with semi-concentrated sodium chloride solution, the solvents were distilled off and the residue obtained was crystallized with ether. After recrystallization from methylene chloride/ether, 20-ethylene-dioxy-pregnane-3$\beta$,5$\beta$, 14$\beta$,21-tetrol was obtained having the same physical data, such as melting and infrared spectrum, as indicated sub (h)1.

(i) Preparation of compound X.—A solution of 14.3 g. of 20-ethylene-dioxy-pregnane-3$\beta$,5$\beta$,14$\beta$,21-tetrol (IX) in 121.4 ml. of glacial acetic acid saturated with nitrogen and 48.4 ml. of water saturated with nitrogen was heated to 100° C. for 45 minutes under an atmosphere of nitrogen. After cooling, the reaction mixture was cautiously introduced into 1040 ml. of saturated sodium bicarbonate, the mixture was extracted several times (7 times) with chloroform, the extracts were washed with water, dried and the solvents were distilled off. The foam-like residue obtained was crystallized from methanol/ether. 11.3 g. of pregnane - 20 - one - 3$\beta$,5$\beta$,14$\beta$,21-tetrol (X) were obtained, M.P. 211–214° C.

Typical infrared bands (in KBr): 3440–3420 (broad), 1700, 1080, 1050, 995, 970, 950, 925, 900, 855, 820 cm.$^{-1}$ in the range of 110–800 cm.$^{-1}$.

EXAMPLE 2

Pregnane-20-one-3$\beta$,5$\beta$,14$\beta$,21-tetrol-3,21-di-tetrahydropyranyl ether 0.64 ml. of dihydropyrane and 3 drops of phosphorus oxychloride were added to a solution of 1 g. of pregnane-20-one-3$\beta$,5$\beta$,14$\beta$,21-tetrol (X) in 8 ml. of absolute tetrahydrofuran. After stirring for 3 hours at 20° C. the reaction mixture was poured into water containing excess sodium bicarbonate and extracted with chloroform. The extracts were washed with water containing a drop of pyridine, and the solvent was distilled off in vacuo. 1.43 g. of pregnane-20-one - 3$\beta$,5$\beta$,14$\beta$,21 - tetrol-3,21-di-tetrahydropyranyl ether were obtained as a limpid clear oil which was dried at 25° C. under greatly reduced pressure.

Yield: 1.31 g.

Typical infrared bands (as oil film): 3500 (shoulder), 3440, 1700, 1190 cm.$^{-1}$ as well as a number of bands in the range from 1150 to 950 cm.$^{-1}$.

We claim:

1. Pregnane - 20 - one - 3$\beta$,5$\beta$,14$\beta$,21 - tetrol-3,21-di-tetrahydropyranyl ether.

2. A process for the manufacture of pregnane-20-one-3$\beta$,5$\beta$,14$\beta$,21-tetrol, which comprises converting $\Delta^{4,14}$-pregnadiene-3,20-dione-21-ol to the corresponding 3,20-bis-alkylene-dioxy-$\Delta^{5,14}$-pregnadiene-21-ol with ethylene glycol or neopentyl glycol; treating this product with an acylating agent to obtain the 21-acylate; partially deketalizing this acylate to form 20-alkylene-dioxy-$\Delta^{4,14}$-pregnadiene-3-one-21-acylate; reducing the 3-keto group thereof with an organometallic reducing agent to a 3-hydroxy group, whereby the 21-acylate group may also be converted by the reducing agent to a 21-ol group; acylating the resultant 20-alkylene-dioxy-$\Delta^{4,14}$-pregnadiene-3,21-diol or -3-ol-21-acylate to form 20-alkylene-dioxy-$\Delta^{4,14}$-pregnadiene-3,21-diacylate; treating this with hypobromous acid to form 5$\alpha$,15$\alpha$-dibromo-20-alkylene-dioxy - pregnane - 3$\beta$,5$\beta$,14$\beta$,21 - tetrol - 3,21 - diacylate; dehydrohalogenating this product with an inorganic or organic base, or with a mixture thereof, to form 20-alkylene - dioxy - 4$\beta$(5$\beta$), 14$\beta$(15$\beta$) - dioxido - pregnane-3$\beta$,21-diacylate or the corresponding -3$\beta$,21-diol; reducing this to 20-alkylene-dioxy-pregnane-3$\beta$,5$\beta$,14$\beta$,21-tetrol with an organometallic reducing agent; and hydrolyzing the 20-alkylene-dioxy group to form the desired pregnane-20-one-3β,5β,14β,21-tetrol.

3. A process as in claim 2, wherein said pregnane-20-one-3β,5β,14β,21-tetrol is reacted with dihydropyrane to form the corresponding 3β,21-ditetrahydropyranyl ether.

References Cited

UNITED STATES PATENTS

| | | | |
|---|---|---|---|
| 2,889,346 | 6/1959 | Ringold et al. | 260—397.47 |
| 2,932,641 | 4/1960 | Ruschig et al. | 260—239.57 |
| 3,087,940 | 4/1963 | Rubin | 260—397.4 |
| 3,087,944 | 4/1963 | Rubin | 260—397.45 |

OTHER REFERENCES

Dferassi: Steroid Reactions, pp. 18 and 19, Holden Day Inc. (1963).

HENRY A. FRENCH, Primary Examiner

U.S. Cl. X.R.

260—239.55 C, 397.45, 999